US006315268B1

(12) United States Patent
Cornea et al.

(10) Patent No.: US 6,315,268 B1
(45) Date of Patent: Nov. 13, 2001

(54) SOLENOID AND HYDRAULIC VALVE WITH A SOLENOID

(75) Inventors: Marius Cornea, Lohr/Main; Hans-Ulrich Leutwein, Partenstein; Lorenz Lippert, Gemünden, all of (DE)

(73) Assignee: Hydraulik-Ring GmbH, Limbach-Oberfrohna (DE)

( * ) Notice: Subject to any disclaimer, the term of this patent is extended or adjusted under 35 U.S.C. 154(b) by 0 days.

(21) Appl. No.: 09/624,125

(22) Filed: Jul. 24, 2000

(30) Foreign Application Priority Data

Jul. 24, 1999 (DE) .......................................... 199 34 846

(51) Int. Cl.[7] .............................. H01F 3/02; H01F 7/08; F16K 31/06

(52) U.S. Cl. .............................. 251/129.15; 251/129.07; 251/325; 137/625.65; 137/625.68; 335/255; 335/262

(58) Field of Search ........................ 251/129.07, 129.15, 251/129.19, 129.21, 325, 355, 282; 335/255, 257, 261, 262; 137/625.68, 625.65; 29/602.1, 890.126, 890.13, 890.132

(56) References Cited

U.S. PATENT DOCUMENTS 3,606,241 * 9/1971 Bornholdt .................. 251/129.07 X
3,726,315 * 4/1973 Sheppard ....................... 137/625.65
3,896,405 * 7/1975 Pauli ............................... 335/255 X
3,932,826 * 1/1976 Read, Jr. ......................... 335/255 X
4,563,664 * 1/1986 Chin et al. ...................... 335/262 X
4,835,426 * 5/1989 Henville .......................... 335/255 X
4,838,954 * 6/1989 Perach ............................ 137/625.65
4,917,352 * 4/1990 Hauet et al. .................... 251/129.19
5,402,093 * 3/1995 Gibas et al. ........................ 335/261
5,856,771 * 1/1999 Nippert ............................... 335/262
5,871,201 * 2/1999 Cornea et al. ................. 251/129.15
5,967,487 * 10/1999 Cook et al. ................ 251/129.07 X

FOREIGN PATENT DOCUMENTS 12 49 043 8/1967 (DE) .
42 10 740 C2 10/1993 (DE) .
195 04 185 A1 8/1996 (DE) .
197 17 445 A1 10/1997 (DE) .

* cited by examiner

*Primary Examiner*—Kevin Shaver
*Assistant Examiner*—Eric Keasel
(74) *Attorney, Agent, or Firm*—Gudrun E. Huckett

(57) ABSTRACT

A solenoid for a hydraulic valve has an armature chamber having chamber walls. A pole core forms one of the chamber walls and has an axial central bore. An armature is slidably arranged in the armature chamber. The armature has a central receptacle. An armature piston is arranged in the central receptacle of the armature and extends through the axial central bore of the pole core. The armature piston consists of a nonmagnetic material. The armature piston acts on a valve member when moved by the armature piston. The armature piston is a tubular member formed of a piece of planar sheet metal and has a radially outwardly projecting anti-stick disc that defines a minimal axial spacing between the armature and the pole core. The radially outwardly projecting anti-stick disc is formed as a monolithic part of the tubular member by parts of the sheet metal being bent radially outwardly relative to the tubular member.

12 Claims, 2 Drawing Sheets

10 35 45 46 32 48 49 31 50 27 26 52 53 28 20 14 19 18 12 21 11 47 51 T 39 58 29 38 30 40 59 36 37 41 17 66 13 15 16 B P A

SOLENOID AND HYDRAULIC VALVE WITH A SOLENOID

BACKGROUND OF THE INVENTION

1. Field of the Invention

The invention relates to a solenoid, in particular, for actuating a hydraulic valve of a motor vehicle, that comprises a pole core delimiting an armature chamber, wherein an armature is slidingly movable in the armature chamber and wherein a minimal axial spacing of the armature relative to the pole core is determined by an anti-stick disc. The solenoid further comprises an armature piston that is received in a central receptacle of the armature and extends through a central bore of the pole core, preferably with formation of a radial gap, wherein the armature piston is preferably made of nonmagnetic material and is used to actuate a valve member when acted on by the armature.

2. Description of the Related Art

Such a solenoid is, for example, known from the German patent document 197 17 445 A1 or the German patent document 195 04 185 A1. In these solenoids the armature piston is produced of solid rod material that has nonmagnetic properties. Between the facing end faces of the armature and the pole core an anti-stick disc is arranged which surrounds the armature piston and whose thickness defines a minimal axial air gap between the armature and the pole core. The anti-stick disc is a separate part and must be threaded onto the armature piston and mounted together with the armature and the armature piston, the latter being pressed into a blind bore of the armature. Overall, the manufacture of the individual parts and their assembly are complex and expensive.

SUMMARY OF THE INVENTION

It is therefore an object of the present invention to develop a solenoid of the aforementioned kind such that it can be produced in a cost-effective manner.

In accordance with the present invention, this is achieved in that for a solenoid of the aforementioned kind the armature piston is produced as a tubular member from a planar sheet metal and comprises an anti-stick disc as a monolithic part of the tubular member wherein the anti-stick disc is formed from the sheet metal by bending parts of the sheet metal material radially outwardly. According to the invention, the armature piston and the anti-stick disc thus are formed as a monolithic part from of a planar sheet metal. In principle, this manufacture can be realized by a stamped-bent part or a deepdrawn part and, especially for large production numbers, can be highly automated. By providing a monolithic part, the assembly expenditure is reduced significantly. Moreover, the process safety is increased because the possibilities of assembly errors are reduced. Overall, the solenoid according to the invention can be produced more cost-effectively and with excellent quality.

According to a preferred embodiment, the armature piston is a stamped-bent part rolled to a tubular member from a planar sheet metal piece. In the vicinity of the armature several metal strips are cut out of the piston wall of the armature piston and bent radially outwardly to form the anti-stick disc while forming openings in the piston wall of the armature piston.

According to another embodiment of the invention, the metal strips, for increasing the thickness of the formed anti-stick disc, are folded over at least once.

Preferably, the individual metal strips and openings are distributed with identical angular spacing about the armature piston. Especially preferred is an arrangement with three metal strips and three corresponding openings having a respective spacing of 120° from one another.

In a preferred embodiment of the invention, the armature piston has on its end face facing away from the armature, or in the vicinity of this end face, an additional opening.

Expediently, the end face of the armature piston facing away from the armature has sheet metal material bent inwardly.

Advantageously, several sheet metal segments of the sheet metal are bent radially inwardly at the end face and leave open a central opening.

When producing the armature piston as a deepdrawn part, the sheet metal material for forming the armature piston is upended in the area of the anti-stick disc and in this way the anti-stick disc is formed. However, when a radial gap is provided between the armature piston arid the central bore of the pole core, which must be bridged by the anti-stick disc, the anti-stick disc must be provided, if needed, with such a great outer diameter that difficulties will arise during the deepdrawing process. When the armature piston is a stamped-bent part, the anti-stick disc is preferably produced in that several metal strips are cut out of the piston wall of the armature piston and are bent radially outwardly in order to produce the anti-stick disc, while leaving openings in the piston wall. In particular, the resulting openings are positioned outside of the armature so that they can be used for oil exchange between the two partial chambers of the armature chamber on both ends of the armature and between the armature chamber and a space in front of the pole core. The formation of the anti-stick disc from individual metal strips has furthermore the advantage that the anti-stick disc will not completely close off a radial gap between the armature piston and the pole core, even though it rests against the inner wall of the pole core. This is different for an uninterrupted anti-stick disc.

A relatively thin sheet metal material is preferably used because it can be easily processed. It is in this connection possible to produce an anti-stick disc which has a thickness that is greater than the thickness of the sheet metal material by folding over the sheet metal strips at least once.

It is especially expedient when the armature piston has an additional opening on the end face facing away from the armature, or in the vicinity of this end face. Via this additional opening, an oil exchange, that is independent of the radial gap between the pole core and the armature piston, can take place between the hollow spaces of the solenoid and a valve connected thereto in order to compensate volume changes resulting from the move men t of the armature and the armature piston or in order to compensate temperature-caused volume changes of the hydraulic oil present within the hollow spaces of the solenoid.

The invention also concerns a hydraulic valve with a hollow piston which is positioned in a valve bore adjoining the pole core. The hollow piston has an end wall delimiting a hollow space in the hollow piston and rests in one end position with the end wall, which can be loaded by the armature piston, against the pole core. In accordance with the present invention, an open connection, i.e., fluid communication, between the hollow spaces of the valve and the hollow spaces of the solenoid can be provided, even when the hollow piston of the valve rests against the pole core, by providing in the end face of the hollow piston a connecting bore which is open toward the hollow chamber and, in the end position of the hollow piston in which the end wall rests against the pole core, this connecting bore is open to the central bore of the pole core. In an especially preferred embodiment, the connecting bore coincides with, or is concentric to, the axis of the hollow piston and is open to the central opening in the end face of the armature piston when the end wall of the hollow piston rests against the pole core. In this way an oil exchange between the valve and the solenoid can take place through the end face of the armature piston.

DESCRIPTION OF THE PREFERRED EMBODIMENTS

Figure 1:
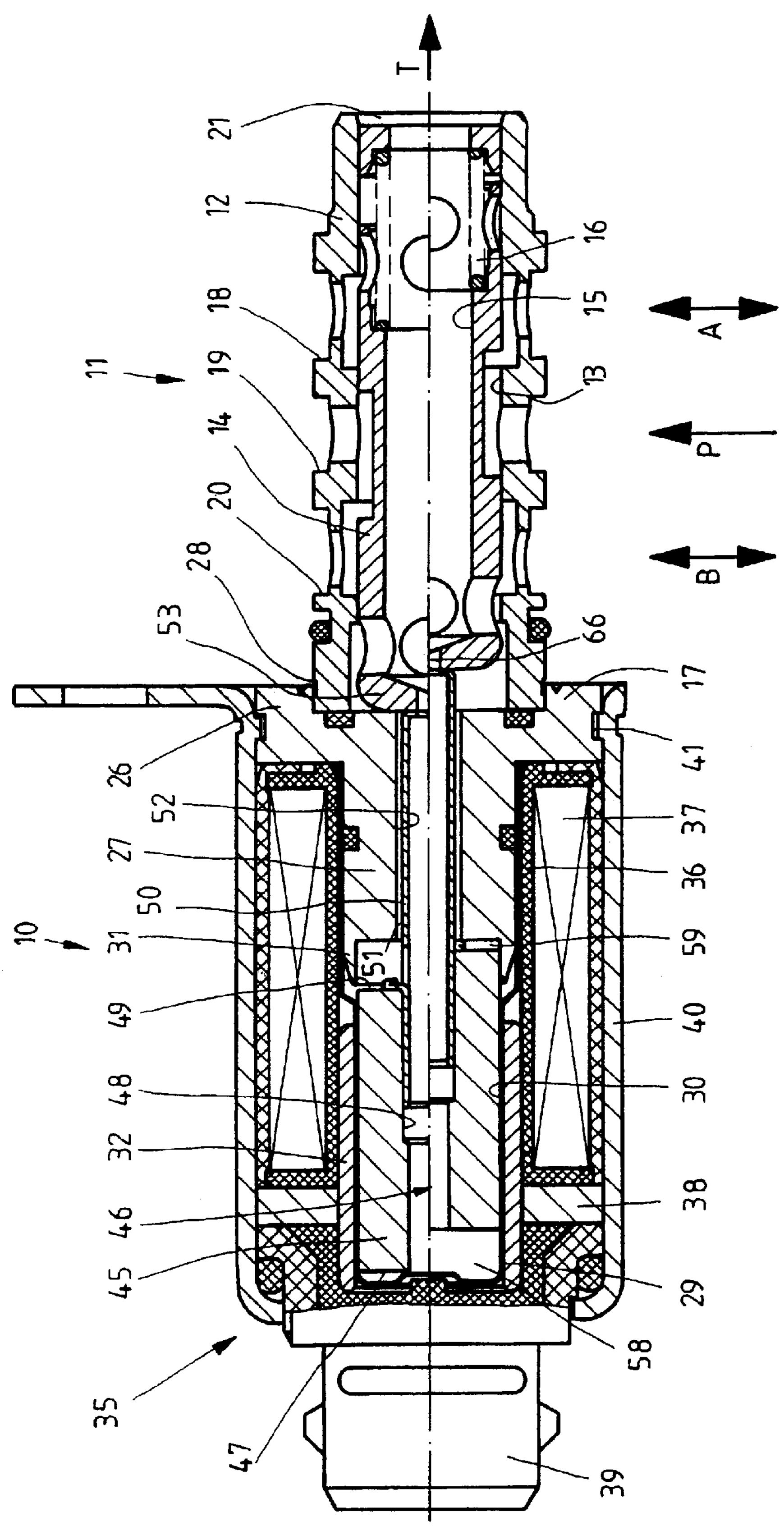
FIG. 1 is a longitudinal section of a solenoid and hydraulic valve according to the invention.
Figure 4:
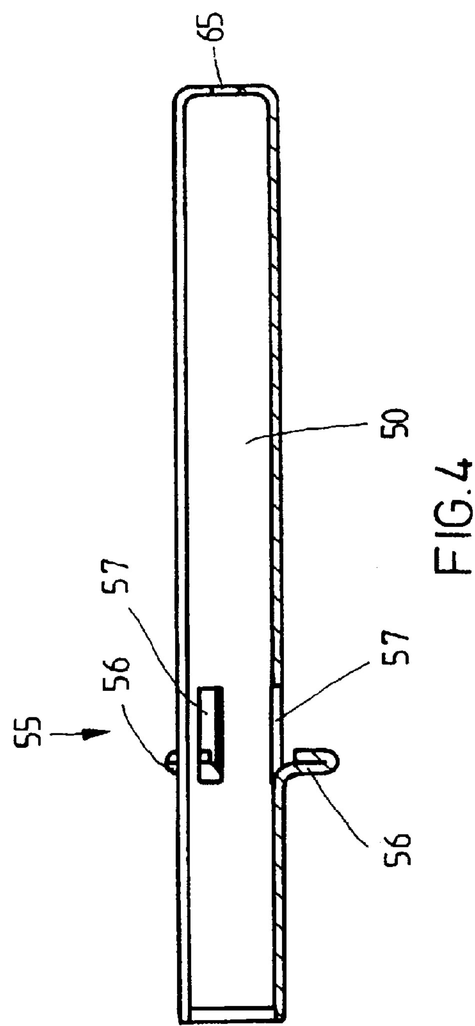
FIG. 4 is a section of the armature piston along section line IV—IV of FIG. 3.
Figure 2:
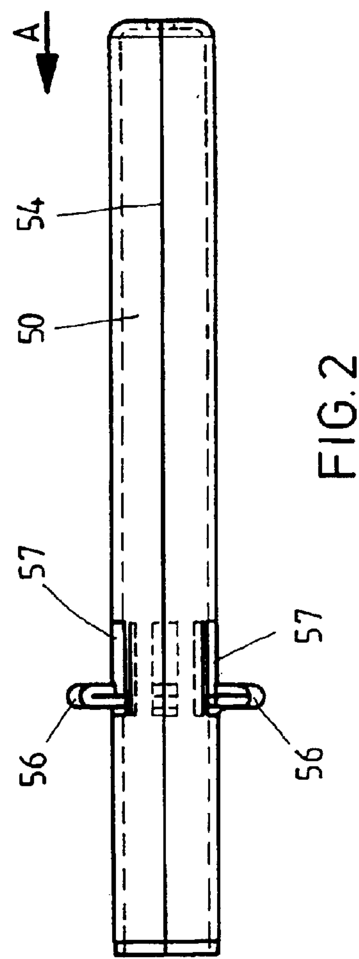
FIG. 2 is a side view of the armature piston alone.
Figure 3:
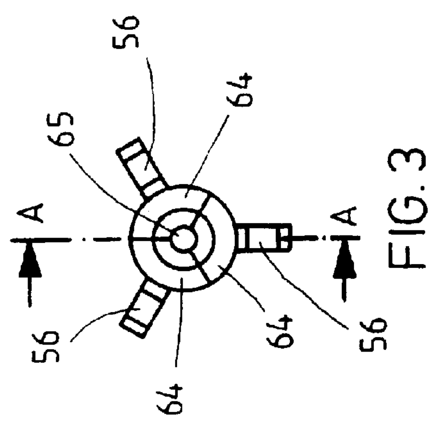
FIG. 3 is an end view of the armature piston in a direction of arrow III of FIG. 2.

The illustrated hydraulic valve comprises a solenoid 10 and a hydraulic part 11. The latter is comprised essentially of a sleeve-shaped valve housing 12 with an axial bore 13 and a valve member in the form of a valve slide 14 which is embodied as a hollow piston with a hollow chamber formed as a blind bore 15 open at one end face. The valve slide 14 is loaded into an end position by means of a pressure spring 16 in which end position it rests against the pole core 17 of the solenoid 10.

On the exterior of the valve housing 12 three axially spaced annular grooves 18, 19 and 20 are formed of which the two outer annular grooves 18 and 20 are provided for fluid communication with a hydraulic consumer. The central annular groove 19 is supplied during operation with hydraulic fluid by means of a pump. The three annular grooves 18, 19, and 20 form three connectors of the valve. A fourth connector is formed by an axial opening 21 of the valve housing 12 facing away from the solenoid 10. The hydraulic liquid can flow from the opening 21 back to a tank. In a neutral position of the valve slide 14 all four connectors are closed relative to one another. Depending on the direction in which the valve slide 14 is moved from the neutral position, one of the consumer connectors is connected to the pump or the tank and the other consumer connector to the tank or the pump. The valve slide 14 is moved into the different positions by cooperation of the pressure spring 16 and the solenoid 10.

The aforementioned pole core 17 of the solenoid 10 is comprised as a monolithic part comprising a disk-shaped portion 26, which is provided on one side with a recess for receiving the valve housing 12, and further comprising a pin 27, which projects from a side of the portion 26 opposite the recess. The valve housing 12 is fixedly connected with the pole core 17, and thus with the solenoid 10, in that material of the pole core 17 is pressed into a circumferential groove 28 of the valve housing 12.

A bushing 29 comprised of thin sheet metal is slipped over the pin 27 of the pole core 17. The bushing 29 together with the pole core 17 encloses an armature chamber 30 of the solenoid 10. The free end of the pin 27 of the pole core 17 supports a circumferential collar 31 which is of a circular cylindrical shape at its radially inwardly facing side and of a cone shape at its radially outwardly facing side. In front of the collar 31 the bushing 29 is reduced with regard to its diameter to a value which corresponds approximately to the inner diameter of the collar 31. A pole tube 32 is slipped over the smaller portion of the bushing 29 and has a certain spacing from the collar 31 of the pole core 17. The outer diameter of the pole tube 32 is identical to the outer diameter of the bushing 29 in the area of the pin 27 of the pole core 17. The pin 27 of the pole core 17, the bushing 29, and the pole tube 32 together form in their entirety a circular cylinder. The pole core 17 and pole tube 32 are produced of a magnetizable material while the bushing 29 is nonmagnetic.

A solenoid coil 35 is slipped onto the aforementioned circular cylinder. The solenoid coil 35 is comprised of a coil support 36 formed of plastic material onto which the coil 37 is wound between the two flanges provided on the coil support 36. A pole disc 38 is embedded in one flange of the coil support 36. The pole disc 38 is comprised of magnetizable material and rests with its inner wall tightly against the pole tube 32. After winding the coil 37, the coil support 36 is then embedded in a second plastic material which covers also the coil 37 and with which an electric plug connector 39 is formed which axially projects from the solenoid 10 at a side opposite the valve housing 12. The solenoid coil 35 is surrounded by a sheet metal housing 40 which is deepdrawn from a magnetizable material. The pole disc 38 rests with its outer rim against the sheet metal housing 40. The sheet metal housing 40 is fixedly connected to the disc-shaped portion 26 of the pole core 17 by pressing sheet metal material into a circumferential groove 41 of the disc-shaped portion 26.

A movable armature 45 is positioned in the armature chamber and is guided tightly, but so as to be easily slidable in the axial direction, in the bushing 29. A stepped bore 46 forming a central receptacle penetrates the armature 45 and has a bore portion with a small diameter and a bore portion with a large diameter. The bore portion of the stepped bore 46 having the smaller diameter is open at the end face 47 of the armature 45 facing the bottom of the bushing 29 and the bore portion 48 with the larger diameter is open at the end face 49 of the armature 45 facing the pole core 17.

An armature piston 50 is inserted into the bore portion 48 of the armature 45 and is guided through a centrally extending axial central bore 52 of the pole core 17. Between the bore portion 48 and the axial central bore 52 a radial gap 51 is formed. The armature piston 50 can load the end wall 53 of the valve slide 14 that is slidably positioned in the blind bore 15. The end wall 53 closes off the blind bore 15 of the valve slide 14. In the upper half of FIG. 1 the end position of the valve slide 14 is shown in which it rests against the pole core 17. The armature 45 and the armature piston 50 are overall slightly shorter than the inner spacing between the bottom of the bushing 29 and the end face 53 of the valve slide 14 so that it is ensured that upon movement into this end position the valve slide 14 will not beat on the armature piston 50. Accordingly, a small path within the movement range of the armature 45 is provided in which the armature piston 50 is not resting against the valve slide 14.

The armature piston 50 is formed as a stamped, bent part produced of a planar sheet metal wherein first a corresponding blank of sheet metal is stamped and the sheet metal blank is subsequently rolled to form a tubular member. As a result of this manufacturing step, a gap 54 extends along the length of the armature piston 50. An anti-stick disc 55, which ensures that between the end face 49 of the armature 45 and the pole core 17 an axial minimum spacing is maintained, is formed as a monolithic part of the armature piston 50. The anti-stick disc 55 is formed in that three parts in the form of rectangular metal strips 56 are cut along three sides out of the piston wall of the armature piston 50 in uniform distribution about the circumference of the armature piston 50 and are bent about a bending edge at the fourth side of the metal strips 56 outwardly so that the metal strips 56 project radially from the armature piston 50. Each metal strip 56 is then folded over so that the anti-stick disc formed of the three metal strips has a thickness that is twice that of the sheet metal thickness. The armature piston 50 is pushed into the armature 45 to such an extent that the anti-stick disc 55 rests against the end face 49 of the armature 45. The openings 57 which result from the outward bending of the metal strips 56 are positioned, when viewed from the armature 45, on the opposite side of the anti-stick disc 55 and are therefore not closed off by the armature 45, as would be the case if the metal strips 56 were cut out of the sheet metal such that the openings 57 resulting after bending would be positioned within the bore 46 of the armature 45, i.e., on the other side of the anti-stick disc 55.

The openings 57 together with the bore 46 provide an oil exchange passage between the two partial chambers 58 and 59 of the armature chamber 30 positioned respectively in front of the two end faces 47 and 49 and, together with the radial gap 51, also provide an oil exchange passage between the hollow spaces of the solenoid 10 and the hydraulic part 11. In the upper half of FIG. 1 the end position of the armature 45 is illustrated in which the partial chamber 58 is smallest and the partial chamber 59 is largest. When the armature 45 is now moved in the direction of the end position illustrated in the lower half of FIG. 1, the oil displaced from the partial chamber 59 flows into the partial chamber 58 via the openings 57, the interior of the armature piston 50, and the bore 46 in the armature 45. A required additional volume flows from the radial gap 51 via the openings 57 into the partial chamber 58. Free oil flow from the partial chamber 59 is possible until the anti-stick disc 55 rests against the pole core 17 because a great peripheral spacing is provided between the metal strips 56, and the oil can enter directly into the radial gap 51 via the space between the metal strips 56. Upon return movement of the armature 45 from the end position illustrated in the lower half of FIG. 1 in the direction toward the end position at the opposite end, oil is displaced from the partial chamber 58 which flows via the bore 46 in the armature 45, the interior of the armature piston 50, and via the openings 57 into the partial chamber 59 and, inasmuch as it is excess oil, it flows into the radial gap 51. The amount of the aforementioned additional volume and the amount of the now mentioned excess as well as the size of the radial gap 51 are adjusted relative to one another such that no oil from the hydraulic part 11 will enter the armature chamber 30. Instead, the movement of the armature 45 causes only an oil column to be moved back; and forth within the radial gap 51. In this manner, the armature chamber 30 which is initially filled with clean oil is protected essentially against soiled oil so that the danger that dirt will enter the armature chamber 30 and that the armature 45 will jam is minimal.

At the end face of the armature piston 50 facing the valve slide 14 three truncated cone-shaped segments 64 are cut out and bent radially inwardly into a radial plane. This provides a large contact surface between the armature piston 50 and the valve slide 14. The segments 64 define centrally a circular central opening 65 whose cross-section is significantly smaller than the cross-section of the radial gap 51 so that it therefore plays only a subordinate role in the exchange of oil during the movements of the armature. In cooperation with a central connecting bore 66 in the end face 53 of the valve side 14, the central opening 65, how ever, provides a fluid communication between the blind bore 15 of the valve slide 14 and the hollow spaces of the solenoid 10, even when the valve slide 14 rests with its end wall 53 against the pole core 17. In this way it is prevented that a vacuum is generated in the solenoid 10 when the system in which the valve is used stands still and the oil cools down.

While specific embodiments of the invention have been shown and described in detail to illustrate the inventive principles, it will be understood that the invention may be embodied otherwise without departing from such principles.

What is claimed is:

1. A solenoid comprising:

an armature chamber (30) having chamber walls;

a pole core (17) forming one of said chamber walls and having an axial central bore (52);

an armature (45) slidably arranged in said armature chamber (30);

said armature (45) having a central receptacle (46);

an armature piston (50) arranged in said central receptacle (46) of said armature (45) and configured to extend through said axial central bore (52) of said pole core (17), wherein said armature piston (50) consists of a nonmagnetic material;

said armature piston (50) configured to act on a valve member (14) when moved by said armature piston (45);

said armature piston (50) being a tubular member formed of a piece of planar sheet metal and comprising a radially outwardly projecting anti-stick disc (55) configured to define a minimal axial spacing between said armature (45) and said pole core (17);

said radially outwardly projecting anti-stick disc (55) formed as a monolithic part of said tubular member by parts (56) of the sheet metal being bent radially outwardly relative to said tubular member.

2. The solenoid according to claim 1, wherein a radial gap (51) is formed between said axial central bore (52) and said armature piston (50).

3. The solenoid according to claim 1, wherein said tubular member is formed from a stamped piece of said sheet metal by rolling up said stamped piece, wherein said parts (56) are metal strips cut from said stamped piece and bent radially outwardly from said tubular member, wherein said radially outwardly bent parts (56) leave openings (57) in said tubular member.

4. The solenoid according to claim 3, wherein said metal strips (56) are folded over at least once to increase a thickness of said anti-stick disc (55).

5. The solenoid according to claim 4, wherein said metal strips (56) and said openings (57) are circumferentially arranged about said tubular member with identical angular spacing relative to one another.

6. The solenoid according to claim 5, wherein three of said metal strips (56) and three of said openings (57) are provided and are spaced at a spacing of 120° to one another.

7. The solenoid according to claim 1, wherein said armature piston (50) has an end face facing away from said armature (45) and has an additional opening (65) in said end face.

8. The solenoid according to claim 1, wherein said armature piston (50) has an end face facing away from said armature (45) and has an additional opening (65) in the vicinity of said end face.

9. The solenoid according to claim 1 wherein said armature piston (50) has an end face facing away from said armature (45) and wherein said sheet metal is bent radially inwardly at said end face.

10. The solenoid according to claim 9, wherein several segments of said sheet metal are bent radially inwardly and wherein free ends of said segments define a central opening (65) in said end face.

11. A hydraulic valve comprising a solenoid (10) according to claim 1, said hydraulic valve comprising:

a housing (12) having a valve b ore (13) aligned with said pole core (17) of said solenoid (10);

a hollow piston (14) slidably arranged in said valve bore (13) and having an interior hollow chamber (15) delimited at one end by an end wall (53);

said end wall (53) configured to be acted on by said armature piston (50);

said hollow piston (14) having an end position in which said end wall (53) rests against said pole core (17);

said end wall (53) having a connecting bore (66) opening into said interior hollow chamber (15) and configured to communicate with said axial central bore (52) of said pole core (17) in said end position of said hollow piston (14).

12. The hydraulic valve according to claim 11, wherein said connecting bore (66) is concentric to a central axis of said hollow piston (14) and, in said end position, communicates with a central opening (65) provided in an end face of said armature piston (50) facing said hollow piston (14).

* * * * *